United States Patent Office 3,002,891
Patented Oct. 3, 1961

3,002,891
PROCESS FOR THE PREPARATION OF
PINEAPPLE STEM BROMELAIN
Ralph M. Heinicke, Honolulu, Hawaii, assignor to Pineapple Research Institute of Hawaii, Honolulu, Hawaii, an association of Hawaii
No Drawing. Filed Dec. 12, 1958, Ser. No. 779,851
11 Claims. (Cl. 195—66)

This invention relates to the production of enzymes and has particular reference to the production of an active enzyme mixture from the stem juice of the pineapple plant.

Many workers have prepared proteolytic enzymes from the juice obtained from pineapple fruit. Recent developments in this field include the discovery that the stem of the pineapple plant is a source of enzyme known as pineapple stem bromelain. However, the pineapple stem is to all outward appearances a rather unlikely commercial source of enzyme. It is fibrous and starchy. The solid content is high and the juice is very difficult to press from the stem. Moreover, while proteins have been precipitated and removed from plant juices by adding organic solvents or salts to the juice in such quantities that the proteins become insoluble, such techniques are not, standing alone, satisfactory for the production of an enzyme from the pineapple stem. Proteins recovered from pineapple stem juice by simple precipitation techniques have unsatisfactory color, solubility, stability and activity.

A primary object of the present invention is, therefore, to provide a process for the production of an enzyme of high activity from the stem of pineapple plants.

Another object of the present invention is to provide a novel process for the commercial production of pineapple stem bromelain.

Still another object of the present invention is to provide a process for the production, in commercial quantities, of an enzyme mixture having high proteolytic activity, containing other enzymes such as acid phosphatase, peroxidase and amylase, and differing substantially from any protease preparation previously produced.

A further object of the present invention is to provide a novel method for the extraction of an enzyme-rich juice from the stem of the pineapple plant.

Other objects and advantages of the present invention it is believed will be readily apparent from the following detailed description of preferred embodiments thereof.

The process of the present invention provides novel means for extraction of the juice from the pineapple stem, includes a method of maintaining the activity of the juice high during the processing steps and provides for the removal from the juice, by fractional precipitation techniques certain materials which are undesirable in the finished product.

In carrying out the process of the present invention it is preferred to use as the raw material mature pineapple stems. The highest concentration of proteases occurs in the lower portion of mature pineapple plant stems. The central portion, the stele, contains more proteases than the outer portion, the cortex. The less mature tissues, especially those that are still succulent, contain little or nor detectable proteases.

Preferably, the stems are stripped of leaves and sucker stems. For best results the stems are pared to remove the roots and the epidermal layer. It has been found that high yields of enzyme-rich juice are obtained by the application to the stems of a shearing force combined with high pressures. The classical methods of extraction of enzyme-containing juices from plant and animal tissues, such as grinding with sand, homogenizing with a Waring Blendor or disintegrating in a meat grinder, are completely inadequate for rupturing the cells and releasing the enzymes from the fibrous tissues of the pineapple stem. However, it has been discovered that the necessary combination of shearing forces and high pressure is obtained by passing the stems through a roller type press such as the sugar cane three roller mill or a Stacomizer mill, or through a screw type press. Such apparatus combine the shearing and pressing actions in one operation, but if desired this can be accomplished in two operations such as, for example, in the utilization of a hammer mill such as a Rietz disintegrator followed by freezing of the pulp and pressing in a Carver press.

The following table illustrates the effectiveness of the shearing and pressing process of the present invention (A and B) as compared to unsatisfactory pressing methods (C and D):

| | Ml. Juice per 100 gms. | M.C.U.[1] per Ml. Juice | Total M.C.U.[1] |
|---|---|---|---|
| A. Sugar mill press | 37 | 152 | 5,630 |
| B. Rietz disintegrator, freezing, then a Carver press | 31 | 129 | 4,000 |
| C. Freezing, then a Carver press | 48 | 27 | 1,300 |
| D. Carver press | 46 | 16 | 735 |

[1] M.C.U.—Milk clotting units, i.e., that quantity of enzyme which will just cause clotting of a 5% skim milk solution adjusted to pH 5.3 in one minute at 37.5° C.

The raw juice from the presses contains dirt, starch grains, broken cells and fibers. These are removed by filtering, centrifuging or by settling techniques.

For best results it is necessary to process fresh juice in carrying out the remaining steps of the process of this invention. Moreover, these subsequent steps should be carried out at a temperature as low as is commercially practicable, i.e., in the neighborhood of 35–45° F. Accordingly, it is preferred to cool the juice immediately after extraction from the stems.

The cooled juice is preferably treated with a reducing agent to improve and stabilize the proteolytic activity of the juice. Also, it has been found that the enzymes made from the juice so treated have better color, activity and keeping qualities than those prepared from untreated juice extracted in large-scale operations. Treatment with the reducing agent is not essential, however, especially where the raw materials comprise mature, peeled stems.

Satisfactory reducing agents include hydrogen sulfide, sulfur dioxide, a soluble sulfide salt such as sodium, calcium or ammonium sulfide, sodium sulfhydrate, a bisulfite salt and hydroxylamine.

For maximum protection with the reducing agent the stem juice should be fresh and should have good activity. After adding the reducing agent the juice should be immediately processed for enzymes. However, if it must be held the juice should be chilled to reduce the amount of oxidation of both the enzyme and added reducing agent.

Old juice which is low in activity may be activated by adding the proper amount of reducing agent. However, the activity never reaches that which would have been obtained if the same juice had been treated when it was fresh.

The amount of reducing agent which will give maximum activation is a characteristic property of both the type of reducing agent added and to a lesser extent of the batch of juice activated. Hydrogen sulfide is the easiest reducing agent to use and is preferred. It may be bubbled into the juice at the receiving tank. Generally because of poor absorption of the gas there is little danger that the juice will be saturated with sulfide. Too much sulfide, i.e. concentrations approaching saturation, reduce the activity of the juice. If salts of sulfide are used the optimum quantity of sulfide to use must be determined by trial runs on each batch of stump juice. In general the concentration should be between .005 to .01 molar.

If sulfur dioxide is used the pH of the solution must be kept from dropping below about 4. A final pH ranging between pH 4–5.5 is satisfactory.

The preferred method of activating and preserving the activity of the enzyme in stem juice is to bubble hydrogen sulfide gas into the freshly pressed juice. In such case the pH should be maintained below about 5. At pH values around pH 5.2 or higher the juice quickly turns black; if the juice is acid no black insoluble sulfides form.

The enzyme or enzyme mixture may be precipitated or otherwise removed from the treated or untreated juice, as the case may be, by conventional methods such as the addition of organic solvents or inorganic salts in such quantities that the proteinaceous material becomes insoluble, by dialysis techniques or by simple vacuum evaporation techniques. It has been found, however, that regardless of the isolation method utilized, it is necessary to lower the pH of the juice to within the range 3.5–5.5 prior to carrying out the step of precipitation of the emzymes from the juice. The pineapple stem juice exhibits an unusual response to changes in pH. Between pH 6 and pH 8 the juice rapidly loses proteolytic activity. Above pH 9 the juice maintains its activity reasonably well but rapidly turns dark. However, when the pH is maintained below 5.5, the activity remains at a high level. This pH is quite critical, however, as enzymatic destruction rapidly sets in at or slightly above this point. It is preferred to observe an upper pH limit of 5.3. As indicated, a pH of as low as 3.5 may be utilized, but generally there is no advantage in maintaining the pH below about 4.0.

As indicated, any of the commonly used protein precipitants may be used to precipitate the enzymes from the juice. Superior results are obtained by utilization of a fractional precipitation technique wherein undesired materials are first precipitated and discarded, followed by precipitation of the desirable fractions. The only restrictions on the choice of precipitants are (1) that it does not denature or inactivate the enzyme unless the enzyme is capable of regeneration, and (2) that it contributes no toxic or other undesirable property to the finished product. It is also desirable that one increment of precipitant will precipitate the undesired fractions and a second increment will precipitate the desirable fractions.

Suitable precipitants include low dielectric water-soluble organic solvents such as acetone, methyl ethyl ketone, methanol, ethanol, isopropanol, and water soluble salts such as ammonium sulfate and sodium chloride.

The exact amount of precipitant which is used to first precipitate the undesirable fractions in the pineapple stem juice depends upon several factors such as the protein concentration of the juice, the temperature of the juice, the length of the holding time, the pH of the juice and the salt concentration. In small scale batch-type operations, where the juice is held for one or two hours after addition of the precipitant, good removal of the undesirable constituents is obtained by the addition of ¼–⅓ volume of acetone or other precipitant per volume of juice, a high yield of enzyme being obtained by then adding (after separation of the first precipitate by centrifuging or equivalent method) sufficient acetone or other precipitant to raise the precipitate concentration in the supernatant to about 50% by volume. However, in large scale continuous operations, using continuous Sharples centrifuges, the same concentrations of acetone produce very poor removal of contaminating material in the first precipitation step and give an extremely low yield of desired enzyme in the second precipitation step. In such continuous operations the first precipitation step requires in the neighborhood of 30–33% by volume in the first precipitation and about 60–66% by volume of acetone in the second precipitation. Generally, the proper concentration can be arrived at by first determining how much precipitant is required to remove all of the active enzyme and then utilizing ¼–½ this amount for the initial precipitation.

The enzyme removed from the second precipitation step is dried to produce the final product. Vacuum drying, air drying, drum drying or spray drying can be used. Freeze drying produces the most satisfactory product.

The following specific examples are illustrative of the processes of the present invention, but it is to be understood that the invention is not to be limited to the specific details thereof:

EXAMPLE 1.—EXTRACTION PROCEDURE a. The "mother" stumps of mature ratoon pineapple plants were stripped of leaves and then pared to remove the roots and the epidermal layer. The cleaned stumps were then quartered and fed into a three roll experimental sugar mill press. The pressed residue was rerun through the mill an additional three times. After the second run, water was added to the pulp to increase the efficiency of the extraction process.

The yield of juice (excluding the water which was added to increase the recovery of enzyme) was 36% of the weight of the peeled stumps. The yield of protein was 0.33 pound per 100 pounds of peeled stumps. The total yield of protease, expressed in milk clotting units, was 25,000 units per pound of stump.

b. In some runs, the stumps were merely stripped of leaves and not pared. The juice from such stumps was acceptable for enzyme processing, but was not as concentrated a source of enzyme as that from peeled stumps. The yield was 15,000 M.C.U./pound of stump.

c. For small scale tests, stumps were peeled, frozen, thawed, and then pressed in a Carver press. Freezing greatly increased the yield of enzyme, but did not equal the efficiency of the sugar mill press.

EXAMPLE 2.—ACETONE PRECIPITATION

To one liter of cold clarified stem juice (34° F.) at pH 5.0 were added 370 ml. of cold (34° F.) acetone. The mixture was held for an hour and then the supernatant liquor containing the bulk of the desired enzyme was syphoned off. The precipitate was freed of desired mother liquor by centrifuging. This precipitate had poor color, poor solubility, and contained about one-sixth of the activity of the final product. After all assays on this fraction were run, it was discarded.

To the combined supernatants were added 630 ml. of cold acetone. The white precipitate was collected by centrifuging, reslurried in fresh cold acetone, and then recovered by centrifuging. The enzyme was left in the centrifuge bottles and dried in a vacuum chamber at low temperatures.

The yield of enzyme was 9.5 gm. of a white powder which contained 4500 M.C.U. per gram. Based on the activity of the starting juice, this represents a recovery of 40% of the proteolytic activity originally present in the juice.

EXAMPLE 2a.—ACETONE PRECIPITATION

Pressed pineapple stem juice was cooled to about 40° F. and then clarified by settling. The acidity of the clear juice was adjusted to pH 4.3 with dilute sulfuric acid. To five liters of juice was added slowly with stirring 2500 ml. of cold acetone. The precipitate which formed was removed by centrifuging. To the clear supernatant were added 3800 ml. of cold acetone. The precipitate was collected, washed in cold dry acetone and then dried in a vacuum chamber. The results of this example are tabulated as follows:

*Recovery of enzyme from five liters of pineapple stem juice*

| Percent Acetone (v./v.) | Wt. of Prec. | Total M.C.U.[1] | M.C.U. per Gm. Ppt. |
|---|---|---|---|
| 33 | 38.83 | 17,233 | 444 |
| 56 | 99.61 | 573,800 | 5,770 |

[1] M.C.U.—Milk clotting units.

EXAMPLE 3.—AMMONIUM SULFATE PRECIPITATION

Solid ammonium sulfate was added to freshly pressed, clarified stem juice until the specific gravity was 1.185. This concentration of salt precipitates practically all of the proteins. The precipitate was dissolved in water, dialyzed to remove the excess salt, and then freeze dried.

Yield of product _____ 6.5 gm./l.
Activity _____ 4700 M.C.U./gm.

EXAMPLE 4.—AMMONIUM SULFATE PRECIPITATION

To one liter of cold (40° F.) clarified pineapple stem juice at pH 4.0 were added 210 gm. of ammonium sulfate. The precipitate which formed was removed by centrifuging. To the supernatant were added 150 gm. of ammonium sulfate. The precipitate was collected by centrifuging and then dissolved in water and dialyzed to remove the ammonium sulfate. The enzyme was recovered from the salt-free solution by acetone precipitation. The results are as follows:

*Recovery of enzyme from one liter of juice by ammonium sulfate precipitation*

| Gms. Ammonium Sulfate per Liter | Total Mg. Protein N in Precipitate | Total M.C.U. in Precipitate |
|---|---|---|
| 210 | 115 | 2,210 |
| 350 (210+140) | 646 | 28,520 |

EXAMPLE 5.—DIALYSIS

Two liters of freshly pressed juice was placed in a Webcell dialyzing chamber and dialyzed against running tap water at 3° C. for two days and then against five gallons of distilled water for one day.

During the dialysis a light grey precipitate appeared. This was removed and discarded.

The supernatant was then freeze dried.

Yield=9.6 gm. of 4200 M.C.U. enzyme per liter.

EXAMPLE 6.—AMMONIUM SULFATE FRACTIONATION OF DIALYZED JUICE

Juice dialyzed as in Example 5 was fractionated with ammonium sulfate. To one liter of dialyzed juice, ammonium sulfate was added until the specific gravity was 1.090. The small amount of precipitate which formed was discarded. To the supernatant additional ammonium sulfate was added until the specific gravity of the solution was 1.160. The precipitate was dialyzed and then freeze dried.

Yield=6 grams of 4600 M.C.U. enzyme per liter.

EXAMPLE 7.—ACTIVATION OF JUICE

Cyanide, sulfide, sulfite, and hydroxyl amine were all tested as activators of the enzyme in stem juice. Of these, the best general activator was sulfide. This was added either as the salt or as hydrogen sulfide gas.

To one liter of juice was added 0.5 ml. of $(NH_4)_2S$ and enough acid to lower the pH to pH 4.5. The procedure described under Example 2 was then followed.

Yield=9 grams of 4600 M.C.U./gm.

EXAMPLE 8.—PILOT PLANT PRODUCTION

Stripped pineapple stumps were passed four times through a three roll sugar mill press. In the second and following passes through the press, water was added to the pulp to increase the efficiency of the extraction procedure. The crude juice was screened to remove the coarse particles. Hydrogen sulfide gas was bled into the collected juice to partially saturate it. The pH was adjusted to pH 4.8 and then the juice was centrifuged.

To 50 gallons of juice were added 30 gallons of cold acetone. The precipitate which formed was removed by centifuging in a Sharples centrifuge. This precipitate was discarded. To the supernatant liquor an additional 35 gallons of acetone was added and the precipitate was collected in a Sharples centrifuge. The wet precipitate was dropped into fresh acetone, mixed well, and then recovered by settling. The paste was then dried in a vacuum oven at a shelf temperature of 110° F.

Yield _____ 8 pounds of enzyme per 100 gallons of juice.
Activity _____ 4000 M.C.U./gram.

The enzyme preparations produced by the present invention differ from any protease preparation produced from other sources. The pineapple stem bromelain even differs from the protease preparation made from the fruits of the same plant. In pineapple fruit juice all of the enzymatic activity is ascribable to proteins with an acid isoelectric point, no proteins with a basic isoelectric point being detected. Electrophoretic analysis of the preparations made in accordance with the present invention establishes that between 80 and 100% of the total proteolytic activity is ascribable to the group of colloids which have basic isoelectric points.

The following table sets forth comparative data relative to the enzymatic activity of the stem bromelain produced by the present process and other proteases:

| | Pineapple | | Papain | Ficin |
|---|---|---|---|---|
| | Stem | Fruit | | |
| Milk Clotting Units/gm | 2,000–5,000 | 800–2,500 | 300 | 2,000–5,000. |
| Activated M.C.U./gm | 2,000–5,000 | 800–2,500 | 800–2,000 | 3,500–5,200. |
| Acid Phosphatase mM/gm | 3–5 | 3–5 | Neg | Neg. |
| Peroxidase Ascorbic Acid Unit/gm | 0–8,000 | | 0–500 | 50,000–80,000. |
| Catalase | Trace | | | |
| Gel. Dig. Units pH 4.5 | 1,000–2,200 | 800–1,500 | 500 | 1,500–2,200. |
| Gel. Dig. Units pH 5.5 | 1,000–2,600 | 500–1,200 | 500 | 1,500–2,200. |
| Tyrosine Dig. Units/mg. pH 7.0 | 190 | | 5 | 100. |
| Tyrosine Dig. Units/mg. pH 8.5 | 180 | | 70 | 150. |
| Gel. Liq. Units | 12,000–18,000 | 7–10,000 | 1,700–3,000 | 3,000–5,000. |
| Oxidase | Lacase | | Yes | Yes. |
| Amylase | Trace | None | None | None. |
| Amidase | None | None | None | None. |
| Asparaginase | None | | | |
| Glutaminase | None | | | |
| Urease | None | None | | |
| Pectinesterase | Trace | | Yes | Yes. |

As used herein and in the appended claims, the term "pineapple stem" or similar terms is intended to mean the stem or stump of plants of the family "Bromeliaceae."

Having fully described my invention, it is to be understood that I do not wish to be limited to the details set forth, but my invention is of the full scope of the appended claims.

I claim:

1. In a process for the production of an enzyme preparation, the steps comprising applying to the stems of pineapple plants a shearing force and applying pressure to the stems to extract therefrom the juice, and separating the juice from the solid materials.

2. In a process for the production of an enzyme preparation, the steps comprising removing the leaves, roots, sucker stems and epidermal layer from mature pineapple plant stems, applying to the stems a shearing force and simultaneously applying pressure to the stems to extract therefrom the juice, and separating the juice from the solid materials.

3. In a process for the production of an enzyme preparation, the steps comprising applying to the stems of pineapple plants a shearing force and applying pressure to the stems to extract therefrom the juice, separating the juice from the solid materials, adjusting the pH of said juice to between about 3.5 and about 5.5, and precipitating and removing the enzymes from said juice.

4. In a process for the production of an enzyme preparation, the steps comprising applying to the stems of pineapple plants a shearing force and applying pressure to the stems to extract therefrom the juice, separating the juice from the solid materials, cooling said juice, adjusting the pH of said juice to between about 3.5 and about 5.5, and precipitating and removing the enzymes from said juice.

5. In a process for the production of an enzyme preparation, the steps comprising applying to the stems of pineapple plants a shearing force and applying pressure to the stems to extract therefrom the juice, separating the juice from the solid materials, adding a reducing agent to said juice by bubbling hydrogen sulfide therethrough, cooling said juice, adjusting the pH of said juice to between about 3.5 and about 5.5, fractionally precipitating the enzymes from said juice by the addition thereto of a first increment of precipitant in sufficient amount to precipitate only the impurities from said juice, removing the precipitated impurities from the supernatant, and then adding a second increment of precipitant in sufficient amount to precipitate the enzymes.

6. In a process for the production of an enzyme preparation from the juice obtained from the stem of the pineapple plant, the steps comprising adjusting the pH of the juice to between about 3.5 and about 5.5, and precipitating and removing the enzymes from said juice.

7. In a process for the production of an enzyme preparation from the juice obtained from the stem of the pineapple plant, the steps comprising cooling the juice, adjusting the pH of the juice to between about 3.5 and about 5.5, and precipitating and removing the enzymes from said juice.

8. In a process for the production of an enzyme preparation from the juice obtained from the stem of the pineapple plant, the steps comprising cooling the juice, adding a reducing agent to said juice, adjusting the pH of the juice to between about 3.5 and about 5.5, and precipitating and removing the enzymes from said juice.

9. In a process for the production of an enzyme preparation from the juice obtained from the stem of the pineapple plant, the steps comprising adjusting the pH of the juice to between about 3.5 and about 5.5, adding a precipitant to said juice to precipitate the enzymes therefrom, and separating the precipitate from the supernatant.

10. In a process for the production of an enzyme perparation from the juice obtained from the stem of the pineapple plant, the steps comprising adjusting the pH of the juice to between about 3.5 and about 5.5, fractionally precipitating the enzymes from said juice by the addition thereto of a first increment of precipitant in sufficient amount to precipitate only the impurities from said juice, removing the precipitated impurities from the supernatant, and then adding a second increment of precipitant in sufficient amount to precipitate the enzymes.

11. In a process for the production of an enzyme preparation from the juice obtained from the stem of the pineapple plant, the steps comprising cooling the juice, adding a reducing agent to said juice, adjusting the pH of the juice to between about 3.5 and about 5.5, fractionally precipitating the enzymes from said juice by the addition thereto of a first increment of precipitant in sufficient amount to precipitate only the impurities from said juice, removing the precipitated impurities from the supernatant, and then adding a second increment of precipitant in sufficient amount to precipitate the enzymes.

References Cited in the file of this patent

UNITED STATES PATENTS

| 1,959,750 | Wada | May 22, 1934 |
| 2,095,300 | Wallerstein | Oct. 12, 1937 |
| 2,676,138 | Hinkel | Apr. 20, 1954 |

FOREIGN PATENTS

| 487,840 | Canada | Nov. 4, 1952 |

OTHER REFERENCES

Cane Sugar Manufacture by Geerligs, pages 116 to 117, published 1924, Norman Rodger, London.

Economic Botany, volume 11 (1957), articled by Heincke and Gortner, pages 225 to 234.